(12) United States Patent
Wu et al.

(10) Patent No.: US 11,023,391 B2
(45) Date of Patent: Jun. 1, 2021

(54) APPARATUS FOR DATA PROCESSING, ARTIFICIAL INTELLIGENCE CHIP AND ELECTRONIC DEVICE

(71) Applicant: Beijing Baidu Netcom Science and Technology Co., Ltd., Beijing (CN)

(72) Inventors: Peng Wu, Beijing (CN); Jian Ouyang, Beijing (CN); Canghai Gu, Beijing (CN); Wei Qi, Beijing (CN); Ningyi Xu, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 0 days.

(21) Appl. No.: 16/506,151

(22) Filed: Jul. 9, 2019

(65) Prior Publication Data
US 2020/0050557 A1    Feb. 13, 2020

(30) Foreign Application Priority Data
Aug. 10, 2018   (CN) .......................... 201810909301.4

(51) Int. Cl.
| | |
|---|---|
| *G06F 13/16* | (2006.01) |
| *G06F 3/06* | (2006.01) |
| *G06F 9/30* | (2018.01) |
| *G06F 9/38* | (2018.01) |
| *G06F 12/0802* | (2016.01) |
| *G06F 13/42* | (2006.01) |
| *G06F 3/08* | (2006.01) |
| *G06N 3/08* | (2006.01) |

(52) U.S. Cl.
CPC ........ *G06F 13/1605* (2013.01); *G06F 3/0659* (2013.01); *G06F 3/0679* (2013.01); *G06F 9/30098* (2013.01); *G06F 9/3887* (2013.01); *G06F 12/0802* (2013.01); *G06F 13/4221* (2013.01); *G06F 3/0607* (2013.01); *G06N 3/08* (2013.01)

(58) Field of Classification Search
CPC ............ G06F 13/1605; G06F 13/4221; G06F 12/0802; G06F 3/0659; G06F 9/3887; G06F 9/30098; G06F 3/0679; G06F 3/0607; G06F 3/0671; G06F 3/0658; G06F 3/0611; G06F 3/0613; G06F 3/0655; G06F 3/067; G06N 3/08; G06N 3/063
USPC ................................ 710/3–4, 9, 20, 51, 113
See application file for complete search history.

(56) References Cited

U.S. PATENT DOCUMENTS

| | | | | |
|---|---|---|---|---|
| 4,278,837 A | * | 7/1981 | Best ..................... | G06F 12/1408 713/190 |
| 4,752,068 A | * | 6/1988 | Endo ...................... | A63F 13/10 463/15 |
| 4,873,626 A | * | 10/1989 | Gifford ............... | G06F 9/30072 710/120 |

(Continued)

*Primary Examiner* — Idriss N Alrobaye
*Assistant Examiner* — Henry W Yu
(74) *Attorney, Agent, or Firm* — The Webb Law Firm (57) ABSTRACT

Disclosed are an apparatus for data processing, an artificial intelligence chip, and an electronic device. The apparatus for data processing includes: at least one input memory, at least one data conveying component, at least one multiplexed arbitration component, and at least one output memory. The input memory is connected to the data conveying component, the data conveying component is connected to the multiplexed arbitration component, and the multiplexed arbitration component is connected to the output memory.

19 Claims, 7 Drawing Sheets

(56) References Cited

U.S. PATENT DOCUMENTS

| | | | | |
|---|---|---|---|---|
| 4,967,398 A * | 10/1990 | Jamoua | ................... | G11C 7/00 |
| | | | | 365/189.04 |
| 5,200,564 A * | 4/1993 | Usami | ................... | G10H 7/004 |
| | | | | 700/3 |
| 5,235,691 A * | 8/1993 | Hirosawa | ............ | G11C 11/4072 |
| | | | | 711/106 |
| 5,282,274 A * | 1/1994 | Liu | .................... | G06F 12/1027 |
| | | | | 711/206 |
| 5,802,560 A * | 9/1998 | Joseph | ................ | G06F 12/0848 |
| | | | | 711/118 |
| 5,884,055 A * | 3/1999 | Tung | .................... | G06F 9/5016 |
| | | | | 709/213 |
| 5,954,812 A * | 9/1999 | Shiell | ................. | G06F 12/0802 |
| | | | | 711/145 |
| 6,052,738 A * | 4/2000 | Muller | ................ | G06F 13/1689 |
| | | | | 709/213 |
| 6,182,192 B1 * | 1/2001 | Rovati | ................ | G06F 13/1631 |
| | | | | 365/191 |
| 6,421,751 B1 * | 7/2002 | Gulick | ................... | G06F 13/42 |
| | | | | 710/107 |
| 9,158,672 B1 * | 10/2015 | Zheng | ................ | G06F 12/0246 |
| 2003/0221089 A1 * | 11/2003 | Spracklen | ........... | G06F 9/30032 |
| | | | | 712/221 |
| 2005/0033875 A1 * | 2/2005 | Cheung | .............. | G06F 13/1605 |
| | | | | 710/29 |
| 2017/0308383 A1 * | 10/2017 | Espasa | ................ | G06F 9/30018 |
| 2018/0039480 A1 * | 2/2018 | Komagata | ............. | G06F 17/153 |
| 2019/0114263 A1 * | 4/2019 | Olorode | ............. | G06F 12/0875 |

\* cited by examiner

APPARATUS FOR DATA PROCESSING, ARTIFICIAL INTELLIGENCE CHIP AND ELECTRONIC DEVICE

CROSS-REFERENCE TO RELATED APPLICATION

This application claims priority to Chinese Patent Application No. 201810909301.4 filed Aug. 10, 2018, the disclosure of which is hereby incorporated by reference in its entirety.

TECHNICAL FIELD

Embodiments of the present disclosure relate to the field of computer technology, and particularly to an apparatus for data processing, an artificial intelligence chip, and an electronic device.

BACKGROUND

As the artificial intelligence technology is applied to more and more fields, the artificial intelligence technology processes increasingly more complex problems, in which the workload involving tensor data computation is increasing huger. At present, in the artificial intelligence technology, data conveying and data transposition of multi-dimensional tensor in deep learning is executed using a general purpose processor, such as a CPU (Central Processing Unit), GPU (Graphic Processing Unit), or DSP (Digital Signal Processing) chip, or based on a special purpose hardware device, such as ASIC (Application Specific Integrated Circuit) or FPGA (Field-Programmable Gate Array).

In data processing based on a general purpose processor, the data access and storage path is complex, involves access and storage of an external memory, and is limited by access bandwidth. The method for data processing based on the special purpose hardware device, such as ASIC or FPGA generally only achieves customized data conveying and data transposition in a particular dimension, and its flexibility is to be improved.

SUMMARY

Embodiments of the present disclosure present an apparatus for data processing, an artificial intelligence chip, and an electronic device.

In a first aspect, an embodiment of the present disclosure provides an apparatus for data processing including: at least one input memory, the input memory configured to store to-be-processed data; at least one data conveying component, the data conveying component configured to read an external processing instruction, parse the processing instruction to acquire a read data address, a write data address, and an operating command, read the to-be-processed data from the at least one input memory based on the read data address, process the to-be-processed data based on the operating command to obtain output data and a corresponding write data address after multiplexed processing, and send a write data request; at least one multiplexed arbitration component, the multiplexed arbitration component configured to receive, in response to receiving the write data request of the at least one data conveying component, the output data and the corresponding write data address of the at least one data conveying component, select output data and a corresponding write data address of one of the at least one data conveying component from the received output data and write data address, output the selected output data and corresponding write data address, and send a write enable signal; and at least one output memory, the output memory configured to receive, in response to receiving the write enable signal sent by the at least one multiplexed arbitration component, the output data and the corresponding write data address from the at least one multiplexed arbitration component, and write the received output data into the corresponding write data address.

In some embodiments, the data conveying component includes: a front-end decoding component, configured to parse the read processing instruction, and execute following parsing: extracting the read data address, the write data address, and the operating command from the processing instruction, sending a read data request to the at least one input memory, caching the to-be-processed data sent by the at least one input memory in response to receiving the read data request into a data queue, and caching the extracted operating command into a command queue; and at least one processing component, each of the at least one processing component configured to process the to-be-processed data in the data queue based on the operating command in the command queue, to obtain a piece of output data.

In some embodiments, the parsing executed by the front-end decoding component further includes: determining whether the operating command is a data conveying command or a data transposition command, broadcasting, by the front-end decoding component, the to-be-processed data sent by the at least one input memory to the processing components if the operating command is the data conveying command; or sending, by the front-end decoding component, the to-be-processed data sent by the at least one input memory to corresponding at least one processing component if the operating command is the data transposition command, where each of the processing components is preconfigured with a corresponding read data address offset.

In some embodiments, the front-end decoding component determines whether the read processing instruction is a single-step execution instruction or a batch instruction after parsing the processing instruction; executes the parsing if the processing instruction is the single-step instruction; or repeatedly executes the parsing a preset number of times if the processing instruction is the batch instruction, and adjusts the read data address and the write data address based on a preset address offset step length after executing the parsing each time.

In some embodiments, the processing component includes: a data register, configured to read the to-be-processed data from the data queue; a command register, configured to read the operating command from the command queue; a state machine, configured to perform state control based on a command of the command register; and a multiplexer, configured to select to-be-processed data from the data register based on control of the state machine, and output the selected to-be-processed data.

In some embodiments, the state machine is further configured to receive the write data address obtained by parsing the processing instruction from the command register, calculate the write data address of the output data based on the received write data address and the write address offset preconfigured in the at least one processing component, and send the write data request and the write data address of the output data to the at least one multiplexed arbitration component.

In some embodiments, the multiplexed arbitration component includes at least one arbitrating unit, each of the at least one arbitrating unit includes an arbiter and a selector, and the arbiter is configured to arbitrate the output data of one of the at least one processing component in the data conveying components, control the selector to select output data of one of the at least one processing component and a corresponding write data address based on a arbitrating result, output the selected output data and corresponding write data address, and send the write enable signal to the at least one output memory.

In some embodiments, the output memory is configured to receive the write enable signal, the output data, and the corresponding write data address outputted by the multiplexed arbitration component, and writes the output data into the corresponding write data address under the control of the write enable signal.

In some embodiments, the input memory and the output memory are on-chip memories.

In a second aspect, an embodiment of the present disclosure provides an artificial intelligence chip, including the apparatus for data processing provided in the first aspect.

In a third aspect, an embodiment of the present disclosure provides an electronic device, including a central processing unit and the artificial intelligence chip provided in the second aspect.

The apparatus for data processing, the artificial intelligence chip, and the electronic device in the above embodiments of the present disclosure include: at least one input memory, the input memory configured to store to-be-processed data; at least one data conveying component, the data conveying component configured to read an external processing instruction, parse the processing instruction to acquire a read data address, a write data address, and an operating command, read the to-be-processed data from the at least one input memory based on the read data address, process the to-be-processed data based on the operating command to obtain output data and a corresponding write data address after multiplexed processing, and send a write data request; at least one multiplexed arbitration component, the multiplexed arbitration component configured to receive the output data and the corresponding write data address of the at least one data conveying component in response to receiving the write data request of the at least one data conveying component, select output data and a corresponding write data address of one of the at least one data conveying component from the received output data and write data address, output the selected output data and corresponding write data address, and send a write enable signal; and at least one output memory, the output memory configured to receive the output data and the corresponding write data address from the multiplexed arbitration component in response to receiving the write enable signal sent by the at least one multiplexed arbitration component, and write the received output data into the corresponding write data address. The apparatus for data processing, the artificial intelligence chip, and the electronic device achieve driving based on a software instruction, have high flexibility, allow flexible support for conveying and transposing tensor data of different types and sizes without hardware modification, and may efficiently expand bandwidth and reduce access and storage delay because the data throughput depends on the bandwidth of matching input memory and output memory.

BRIEF DESCRIPTION OF THE DRAWINGS

By reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
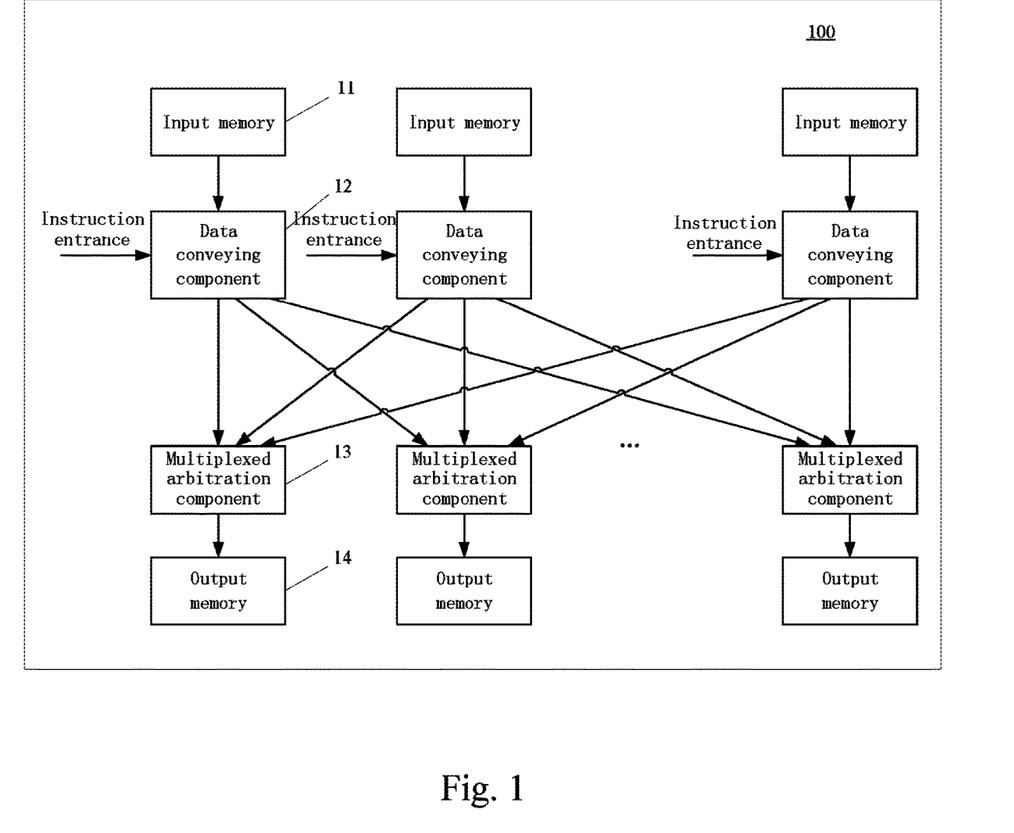
FIG. 1 is a schematic structural diagram of an apparatus for data processing according to an embodiment of the present disclosure.

FIG. 1 shows a structure 100 of an apparatus for data processing according to an embodiment of the present disclosure.

As shown in FIG. 1, the apparatus for data processing of the embodiment of the present disclosure may include at least one input memory 11, at least one data conveying component 12, at least one multiplexed arbitration component 13, and at least one output memory 14. The input memory 11 is connected to the data conveying component 12, the data conveying component 12 is connected to the multiplexed arbitration component 13, and the multiplexed arbitration component 13 is connected to the output memory 14.

The input memory 11 stores to-be-processed data. Here, the to-be-processed data may be tensor data in deep learning calculation, e.g., a two-dimensional gray matrix representing an image inputted into the deep learning network. The to-be-processed data may be written into the input memory by a processing unit (e.g., a CPU) outside the apparatus for data processing or other customized apparatus. The input memory 11 may be a dual-ported SRAM (Static Random Access Memory), and its bit width may be, for example, 512 bits. The bit width of data in the input memory may be 32 bits, and then each row of the input memory may store 16 pieces of data.

Optionally, the apparatus 100 for data processing of the embodiment of the present disclosure may include at least two input memories, at least two data conveying components, at least two multiplexed arbitration components, and at least two output memories. There may be one-to-one correspondence between the input memories, the data conveying components, the multiplexed arbitration components, and the output memories. Moreover, in some implementations, the numbers of input memories, data conveying components, multiplexed arbitration components, and output memories in the apparatus for data processing may be expanded or configured based on service requirements (e.g., access and storage speed, or bandwidth requirements). When the apparatus for data processing includes a plurality of input memories, the plurality of input memories may be unifiedly addressed, i.e., the plurality of input memories may be addressed in succession. For example, for a two-dimensional array D[ ] [ ], the first row of the first input memory may store D[0] [0], D[0] [1], D[0] [2], . . . , D[0] [15], and the first row of the second input memory may store D[0] [16], D[0] [17], D[0] [18], . . . , D[0] [31].

The input memory 11 may receive a read data request sent by the data conveying component 12 connected to the input memory. The read data request may be a request for reading data at a specified address. The input memory 11 may output the data at the correspond address to the data conveying component 12.

The data conveying component 12 may read an external processing instruction, parse the processing instruction to acquire a read data address, a write data address, and an operating command, read the to-be-processed data from the input memory based on the read data address, process the to-be-processed data based on the operating command to obtain output data after multiplexed processing and a corresponding write data address, and send a write data request to the multiplexed arbitration component connected to the data conveying component 12.

Here, the data conveying component 12 may have an instruction entrance, i.e., instruction receiving port, and read the external processing instruction by the instruction entrance. The processing instruction may be used to indicate a processing operation on the to-be-processed data. The read data address obtained by the data conveying component 12 from parsing the processing instruction may be an address of the to-be-processed data in the input memory 11, or optionally, the read data address is an initial address of the to-be-processed data in the input memory 11. The write data address may be an address of processed data written into the output memory 14, or optionally, the write data address may be an initial address of processed output data written into the output memory 14. The operating command may be used to indicate an operation executed on the to-be-processed data, for example, transposition operation or conveying operation. Here, the transposition operation may be transposing data in a dimension of tensor data to another dimension of the tensor data, and the conveying operation may be conveying operation on the tensor data. Optionally, the data conveying component 12 may further acquire a data write-in approach after parsing the processing instruction. The data write-in approach is used for indicating an approach of writing the output data into the output memory 14, such as serial write-in.

The data conveying component 12 may send the read data request, i.e., a read data request containing the read data address, to the input memory based on the read data address obtained by parsing. The input memory 11, after receiving the read data request, may transmit data stored at the read data address as the to-be-processed data to the data conveying component 12, so that the data conveying component 12 may acquire the to-be-processed data based on the external processing instruction.

The data conveying component 12 may process the to-be-processed data based on the above operating command to obtain the output data, and may calculate write data address corresponding to respective pieces of output data based on the write data address obtained from parsing the external processing instruction. For example, the write data address obtained from parsing the external processing instruction may be used as an initial write address, and the initial write address may be migrated backward sequentially based on output timing sequence of the output data, to obtain the write data address of the corresponding output data. The output data and the corresponding write data address may be sent to the multiplexed arbitration component 13. In the present embodiment, a plurality of data conveying components 12 in the apparatus 100 for data processing may send the output data and the corresponding write data address to a given multiplexed arbitration component 13. Each of the data conveying components 12 may alternatively send the output data and the corresponding write data address to at least two multiplexed arbitration components 13. Optionally, the data conveying components 12 send the output data and the corresponding write data address to the multiplexed arbitration components 13 13 respectively. The data conveying component 12 may alternative send the write data request to the multiplexed arbitration component 13.

The multiplexed arbitration component 13 may receive a write data request of at least one data conveying component 12, and receive the output data and the corresponding write data address of the at least one data conveying component 12 in response to the received write data request. The multiplexed arbitration component 13 may arbitrate the received output data, select output data and a corresponding write data address of one of the data conveying components 12 from the received output data and corresponding write data address of the at least one data conveying component 12, output the selected output data and corresponding write data address, and send a write enable signal to the output memory 14, so that the at least one output memory 14 turns on the storage function.

Optionally, the multiplexed arbitration component 13 may have a plurality of input ports having one-to-one correspondence with the data conveying components, and each of the input ports receives the output data and the write data address of one of the data conveying components 12. The multiplexed arbitration component 13 may select one input port from the plurality of input ports in accordance with a preset arbitration strategy, and output the output data and the write data address of the data conveying component received by the selected input port. The output data and the write data address received by an unselected input port may be outputted by other multiplexed arbitration component, or be outputted by the multiplexed arbitration component after repeated request.

The output memory 14 may receive the output data and the corresponding write data address from the multiplexed arbitration component 13 in response to receiving the write enable signal sent by the multiplexed arbitration component 13, and write the received output data into the corresponding write data address. The output memory 14 may also be a dual-ported SRAM, and its bit width may be, for example, 32 bits. The output memories 14 may be linearly addressed in the data bit width direction. Taking two-dimensional data D[ ][ ] as an example, the first output memory may store D[0] [0], D[1] [0], D[2] [0], . . . , and the second output memory may store D [0] [1], D[1] [1], D[2] [1], . . . , and the like.

After the output memory 14 writes the output data into the corresponding write data address, the multiplexed arbitration component 13 may return a write response signal to the data conveying component.

The apparatus for data processing of the above embodiments of the present disclosure includes at least one input memory, at least one data conveying component, at least one multiplexed arbitration component, and at least one output memory. The numbers of input memories, data conveying components, multiplexed arbitration components, and output memories may be expanded or provided based on service requirements. For example, in the process of training a neural network based on deep learning, when conveying or transposition of a large data volume of tensor data is required, the numbers of desired input memories and output memories may be calculated based on the tensor data bit width, and then the data conveying component and the multiplexed arbitration component of the corresponding data are provided, so that the conveying and transposition of the tensor data of different types and sizes may be flexibly supported without modifying the hardware device.

The data access and storage path of the above apparatus for data processing is simple, its throughput depends on the bandwidth of the input memory and the output memory, and a high-bandwidth memory may be employed to expand the bandwidth and reduce access and storage delay. In addition, the apparatus for data processing receives the external processing instruction through an instruction entrance, parses the processing instruction to acquire the data address and the operating command, thereby achieving driving based on the software instruction, and having high flexibility.

Optionally, in order to further enhance the data access and storage speed, and reduce delay, on-chip memories may be employed as the input memory and the output memory.

Figure 2:
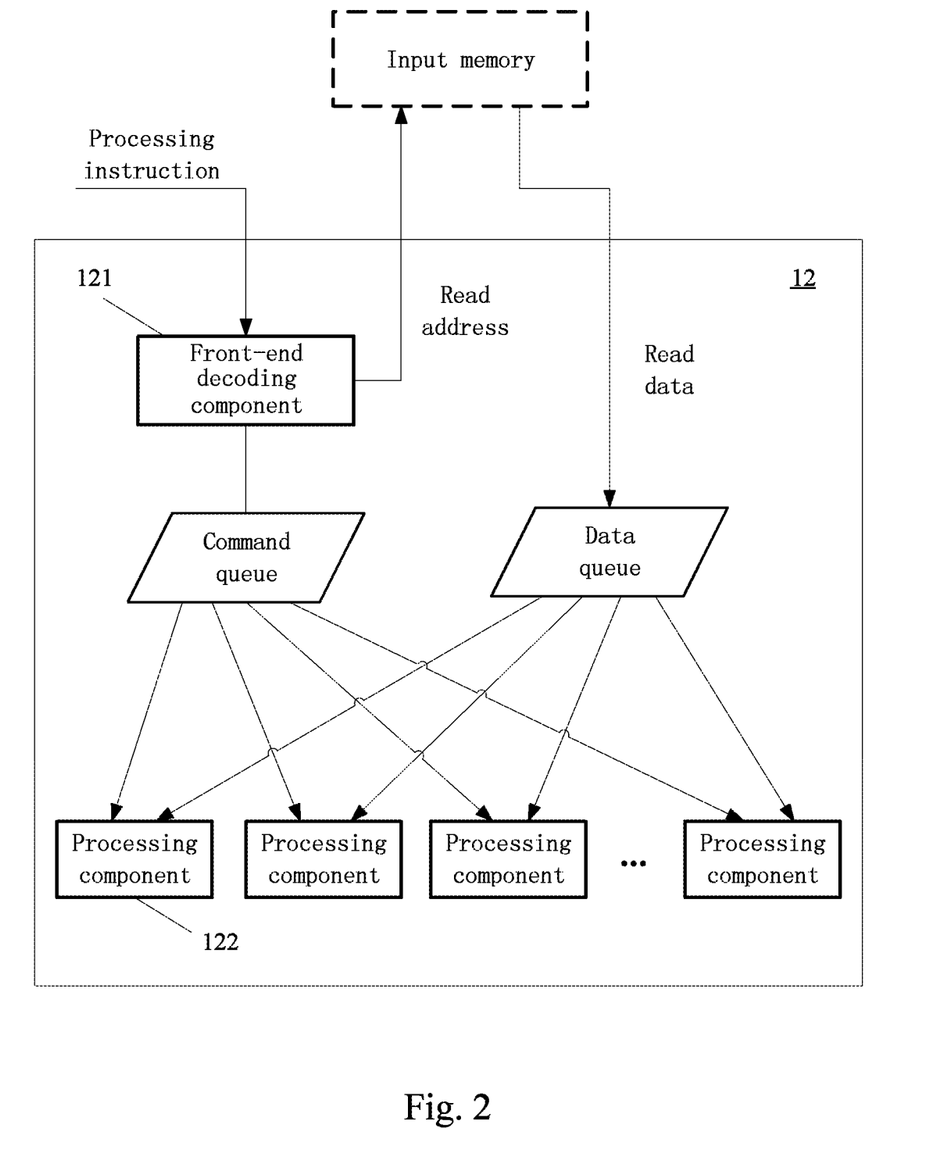
FIG. 2 is a schematic structural diagram of a data conveying component in the apparatus for data processing according to an embodiment of the present disclosure.

Further referring to FIG. 2, a schematic structural diagram of a data conveying component in the apparatus for data processing according to an embodiment of the present disclosure is shown. As shown in FIG. 2, the data conveying component 12 may include a front-end decoding component 121 and at least one processing component 122. The front-end decoding component 121 may execute parsing on a processing instruction. The parsing may include: extracting a read data address, a write data address, and an operating command from the processing instruction, sending a read data request to the input memory, caching the to-be-processed data sent by the input memory in response to receiving the read data request into a data queue, and caching the extracted operating command into a command queue. Each of the processing components 122 may process the to-be-processed data in the data queue based on the command in the command queue, to obtain a piece of output data.

Optionally, after parsing the processing instruction, a write-in approach of writing the data may also be extracted. The write-in approach may be writing into a row in parallel to the output memory, or may be writing into a column of the output memory.

In the present embodiment, the operating command in the command queue and the corresponding to-be-processed data in the data queue of the data conveying component may be distributed to the processing components 122 for processing. Each of the processing components 122 may be preconfigured with a corresponding read data address offset and a corresponding write data address offset. Here, the read data address offset may represent an offset of the to-be-processed data read by the processing component relative to an address of the first piece/first set of read to-be-processed data, and the write data address offset may represent an offset of the output data written by the processing component relative to an address of the first piece/first set of written to-be-processed data. Specifically, each processing component 122 may have a separate code that may be used to identify the read data address offset of the to-be-processed data or the write data address offset of the output data corresponding to the processing component. For example, each of the processing components 122 may only process data in one column of the input memory, a processing component coded as x1 may correspondingly process data in the first column of the input memory, and a processing component coded as x2 may correspondingly process data in the second column of the input memory, and so on. Thus, according to the read data address of the to-be-processed data, the to-be-processed data may be distributed to a processing component 122 having a corresponding code for processing. The specific processing operation may be, for example, data transposition or data conveying. There may be one-to-one correspondence between the operating command in the command queue and the to-be-processed data in the data queue. The processing component 122 may read the to-be-processed data from the data queue based on its code, acquire the corresponding operating command from the command queue, and execute the operating command to obtain the output data.

Optionally, the parsing may further include: determining whether the operating command is a data conveying command or a data transposition command.

Here, the data conveying command may be a command of conveying data in the input memory to the output memory. The write data address obtained by parsing the processing instruction may be an address of the first piece of data written into the output memory. Then, in the data conveying process, the address offset of the to-be-processed data may be calculated based on a preset address offset step length. For example, an offset relative to an address "xxxxx" of the first piece of data is 2, and then the write data address of the output data corresponding to the to-be-processed data is determined to be an address of offsetting "xxxxx" by 2 units. Here, the data are not changed in the data conveying process, and only the to-be-processed data are conveyed to the output memory. The to-be-processed data sent by the input memory may be data in some rows. If the operating command is the data conveying command, then the front-end decoding component may broadcast the to-be-processed data sent by the input memory to the processing components 122, and each of the processing components 122 receives and conveys data in a column corresponding to itself of the to-be-processed data.

The data transposition command may be a command of performing transposition on the to-be-processed data. The write data address obtained by parsing the processing instruction may be the address of the first piece of data or the first column of data written into the memory. In the data transposition process, an offset of the to-be-processed data in each column may be calculated based on the preset address offset step length, and then a storage address of the to-be-processed data in each column may be calculated based on the write data address. For example, when the address offset step length is 2, and the write data address obtained by parsing is "yyyyy," a storage address of the transposed to-be-processed data in the first column is an initial address of offsetting "yyyyy" by 2 units. Here, the transposition operation may be transposing each column of the to-be-processed data to each row of the output data. The to-be-processed data sent by the input memory may be data in some rows. If the operating command is the data transposition command, then the front-end decoding component may send the to-be-processed data sent by the input memory to corresponding at least one processing component. The to-be-processed data sent by the input memory may be data in some rows, each of the processing components may determine a corresponding column of data based on its code, and then after receiving the data transposition command, may send each column of data in some columns to a processing component corresponding to the column of data for transposition and calculation of the corresponding write address.

Figure 3:
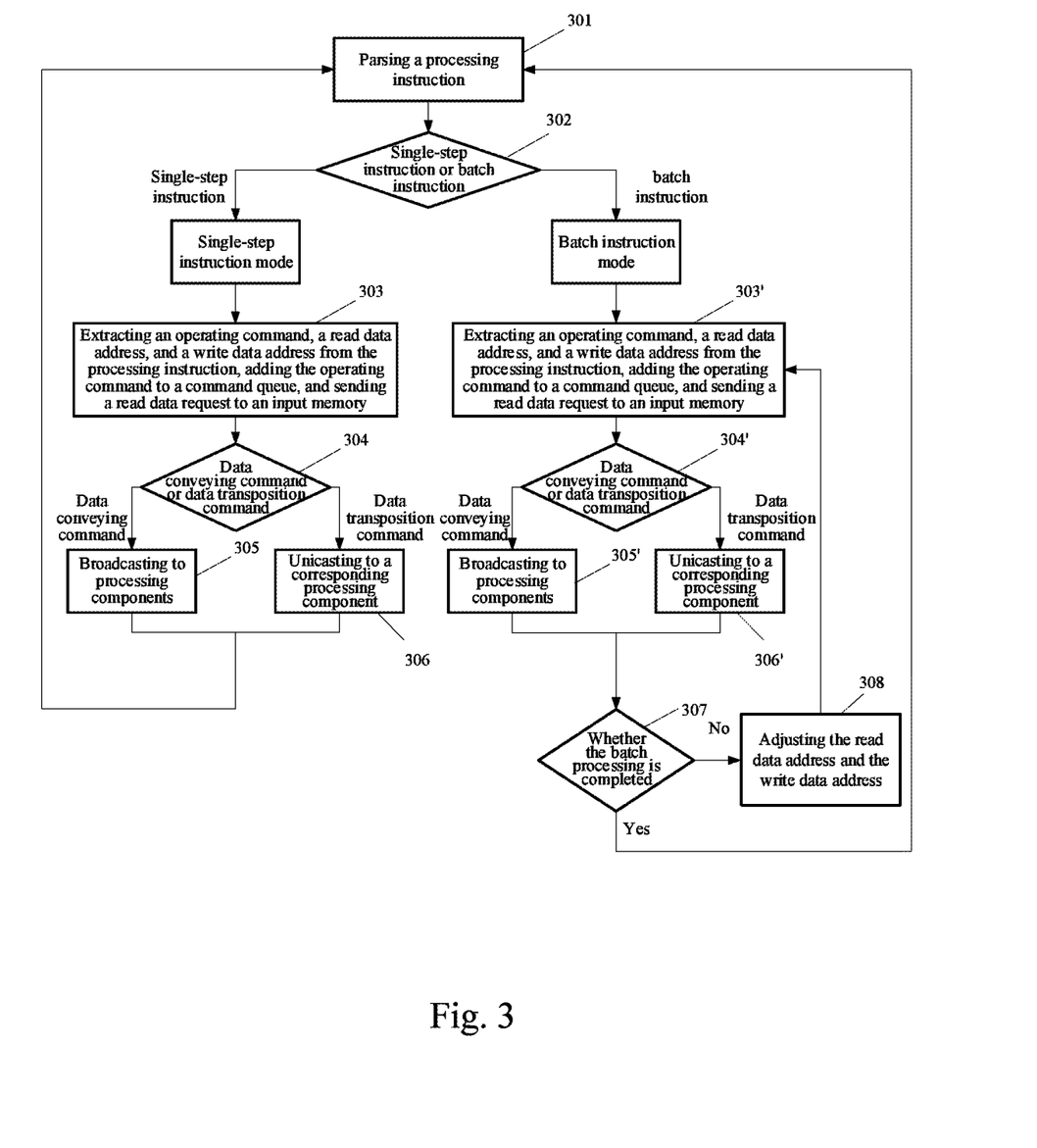
FIG. 3 is a schematic flowchart of executing an operation by a front-end decoding component in the data conveying component.

In some optional implementations of the present embodiment, before executing the parsing, the front-end decoding component may further determine whether the read processing instruction is a single-step instruction or a batch instruction. Referring to FIG. 3, a schematic flowchart of executing an operation by a front-end decoding component in the data conveying component is shown.

As shown in FIG. 3, a process 300 of executing an operation by the front-end decoding component includes: first in step 301, parsing a processing instruction, and then in step 301, determining whether the processing instruction is a single-step instruction or a batch instruction. The single-step execution instruction may be an instruction of processing a set of to-be-processed data in the input memory, and the batch instruction may be an instruction of processing a plurality of sets of to-be-processed data in the input memory.

If the determining result in step 301 is the single-step instruction, then a single-step instruction mode is entered, and the parsing shown in steps 303 to 306 is executed. Specifically, step 303 includes: extracting an operating command, a read data address, and a write data address from the processing instruction, adding the operating command to a command queue, and sending a read data request to an input memory. After receiving the read data request, the input memory may send the to-be-processed data to a data conveying component. Then, step 304 includes: determining whether the operating command is a data conveying command or a data transposition command, if the operating command is the data conveying command, then executing step 305: broadcasting the to-be-processed data to processing components; and if the operating command is the data transposition command, then executing step 306: unicasting the to-be-processed data to a corresponding processing component. Then, step 301 may be returned to parse a next received processing instruction.

If the determining result in step 302 is that the processing instruction is the batch instruction, then the parsing shown in step 303', step 304' and step 305' or step 306' may be executed repeatedly a preset number of times. The read data address and the write data address may be adjusted based on a preset address offset step length after completing executing the parsing each time. That is, after completing parsing a set of to-be-processed data, a read data address of a next set of to-be-processed data may be calculated based on a preset read address offset step length (e.g., read address offset step length is 1). Then, the next set of to-be-processed data is read and parsed, and a write data address of the next set of to-be-processed data is calculated based on a preset write address offset step length (e.g., write address offset step length is 2). Thus, the parsing may be repeatedly executed a plurality of times, and whether the batch processing is completed may be determined in step 307 after completing the parsing each time. If the parsing is not completed, then returning to execute the parsing after adjusting the read data address and the write data address in step 308. If the batch processing is completed, then returning to parse a next processing instruction received by an instruction entrance.

As can be seen from FIG. 3, the front-end decoding component may flexibly parse an external processing instruction, acquire the to-be-processed data, the read data address, and the write data address based on the external processing instruction, and broadcast the to-be-processed data to a corresponding processing component for processing, such that the data conveying component including the front-end decoding component achieves flexibly driving based on the software instruction.

Figure 4:
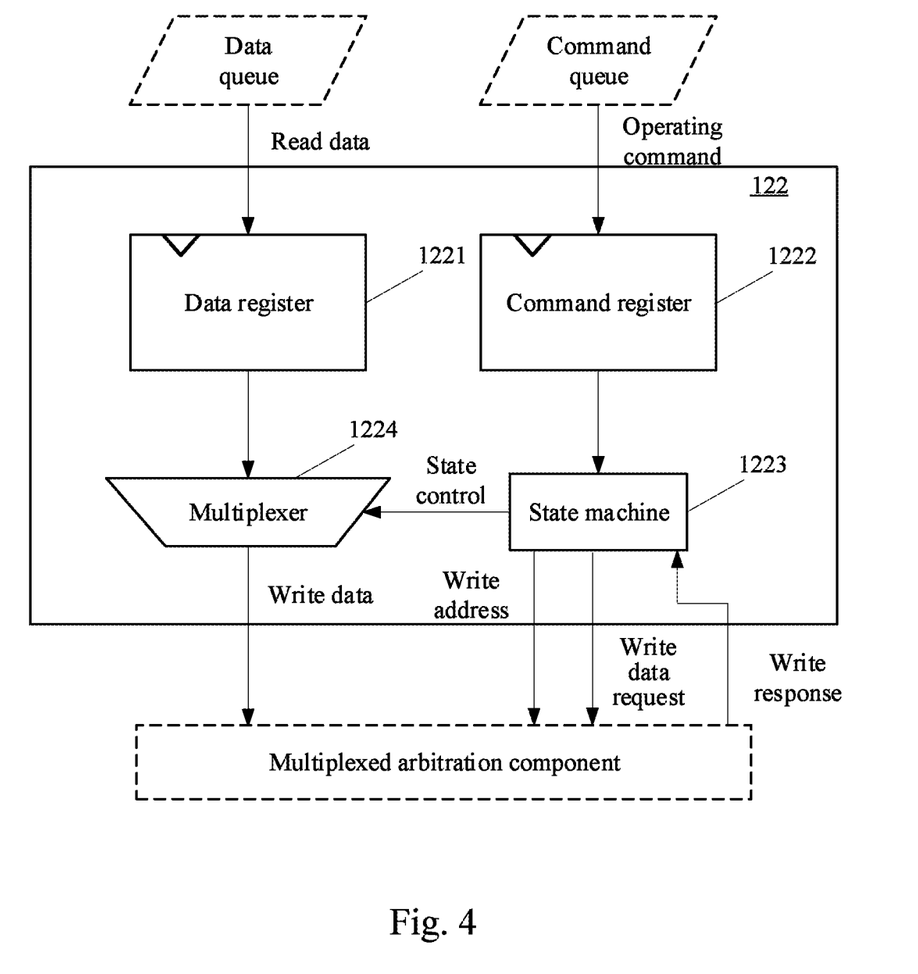
FIG. 4 is a schematic structural diagram of a processing component in the data conveying component.

Further referring to FIG. 4, a schematic structural diagram of a processing component in the data conveying component in an optional implementation of the embodiment of the present disclosure is shown.

As shown in FIG. 4, the processing component 122 may include a data register 1221, a command register 1222, a state machine 1223, and a multiplexer 1224. The data register 1221 is configured to read the to-be-processed data from the data queue. The command register 1222 is configured to read the operating command from the command queue. The state machine 1223 is configured to perform state control based on a command of the command register. The multiplexer 1224 is configured to select the to-be-processed data from the data register 1221 based on control of the state machine 1223, and outputs the selected to-be-processed data.

The data register 1221 may transfer transmit the to-be-processed data in the data queue successively sequentially to the multiplexer 1224, and the multiplexer 1224 may cache these to-be-processed data. The command register 1222 may transfer transmit commands in the command queue sequentially to the state machine. The state machine 1223 may analyze parse operating commands transferred transmitted by the command register, and control the multiplexer 1224 based on a currently received command. Specifically, the state machine may select one or more sets of to-be-processed data cached in the multiplexer 1224 based on the current operating command, and output the selected one or more sets of to-be-processed data. For example, when the currently received operating command is a command of transposing data A, the state machine 1223 may output a control signal to the multiplexer 1224, so that the multiplexer 1224 selects the corresponding data A and outputs the selected data A. The state machine 1223 may further calculate a write data address of data corresponding to the currently received operating command, and may specifically receive the write data address obtained by parsing the processing instruction from the command register, calculate the write data address of the output data based on the received write data address and a write address offset preconfigured in the processing component, i.e., determining a write data address offset based on a code of the processing component, and obtain the write data address corresponding to the current command by offsetting the write data address received by the state machine based on the write data address offset. Alternatively, the front-end decoding component may calculate the write data address of the output data corresponding to the current command based on the write data address offset corresponding to the code of the processing component, and the state machine 1223 may receive the write data address of the output data corresponding to the current command calculated by the front-end decoding component from the command register. The state machine 1223 may further send a write data request to a multiplexed arbitration component, and send the write data address of the output data to the multiplexed arbitration component.

Figure 5:
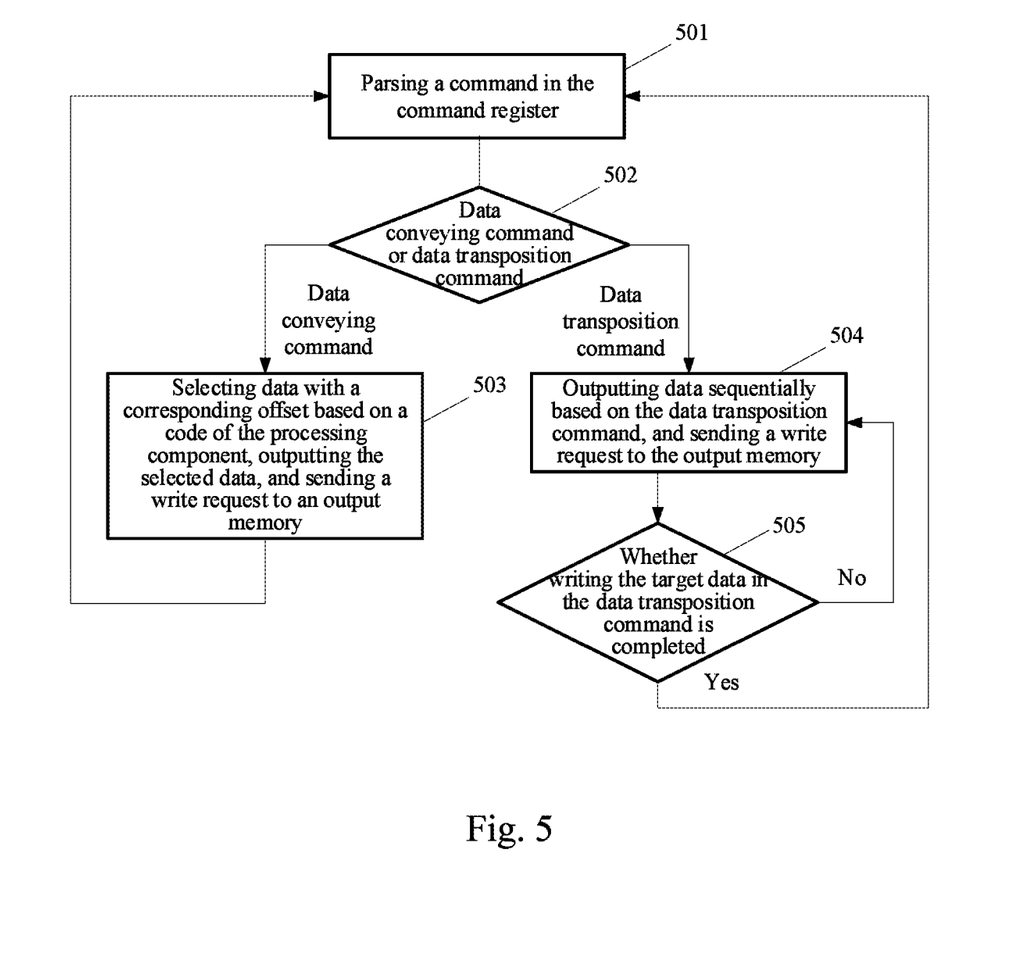
FIG. 5 is a schematic flowchart of executing data processing by the processing component in the data conveying component.

Referring to FIG. 5, a schematic flowchart of executing data processing by the processing component in the data conveying component is shown.

As shown in FIG. 5, a process 500 of executing a processing operation by the processing component may include: step 501: parsing a command in the command register. Specifically, the state machine 1223 may extract an operating command from the command register, and then may determine whether the operating command is a data conveying command or a data transposition command in step 502. If the determining result in step 502 is the data conveying command, then step 503 is executed: selecting data with a corresponding offset based on a code of the processing component, outputting the selected data, and sending a write request to an output memory; and if the determining result in step 502 is the data transposition command, then step 504 is executed: outputting data sequentially based on the data transposition command, and sending a write request to the output memory. Then, step 505 is executed: determining whether writing the target data in the data transposition command is completed. If the determining result in step 505 is completing executing the target data in the data transposition command, then step 501 may be returned: parsing a next command in the command register. If the determining result in step 505 is not completing executing the target data in the data transposition command, then step 504 may be returned: outputting data sequentially based on the data transposition command, and sending a write request to the output memory.

The processing component may be preconfigured with a corresponding write data address offset. Specifically, the processing component may have a separate code, and each of the processing components may determine an offset of an address of data processed by the processing component based on its code relative to an input data address indicated by an external processing instruction read from an instruction entrance. In the above step 503, the processing component may select data with a corresponding offset based on its code, and output the selected data. For example, the code of a processing component is C1, and corresponds to an offset of 4, then the processing component may select data stored at an address with an offset of 4 relative to the input data address, and output the selected data. In this case, data outputted by the processing component is the data stored at the address with the offset of 4 relative to the input data. The processing component may further send the write request to the output memory.

Target to-be-processed data in the data transposition command is data in a row of the input memory. Each of the processing components correspondingly processes data in a column of the input memory based on its code. Then, in step 504, the processing component may sequentially output data in a column corresponding to its code among the to-be-processed data, and in step 505, may determine whether transposition of data in a to-be-processed row is completed. If transposition of the data in the to-be-processed row is not completed, then step 504 is returned: a next processing component of the plurality of processing components in the data conveying component continues to output data in a next column. In this case, the output data of the processing component is data obtained by transposition of data in the input memory. The processing component, when outputting data, may send a write request to the multiplexed arbitration component.

Figure 6:
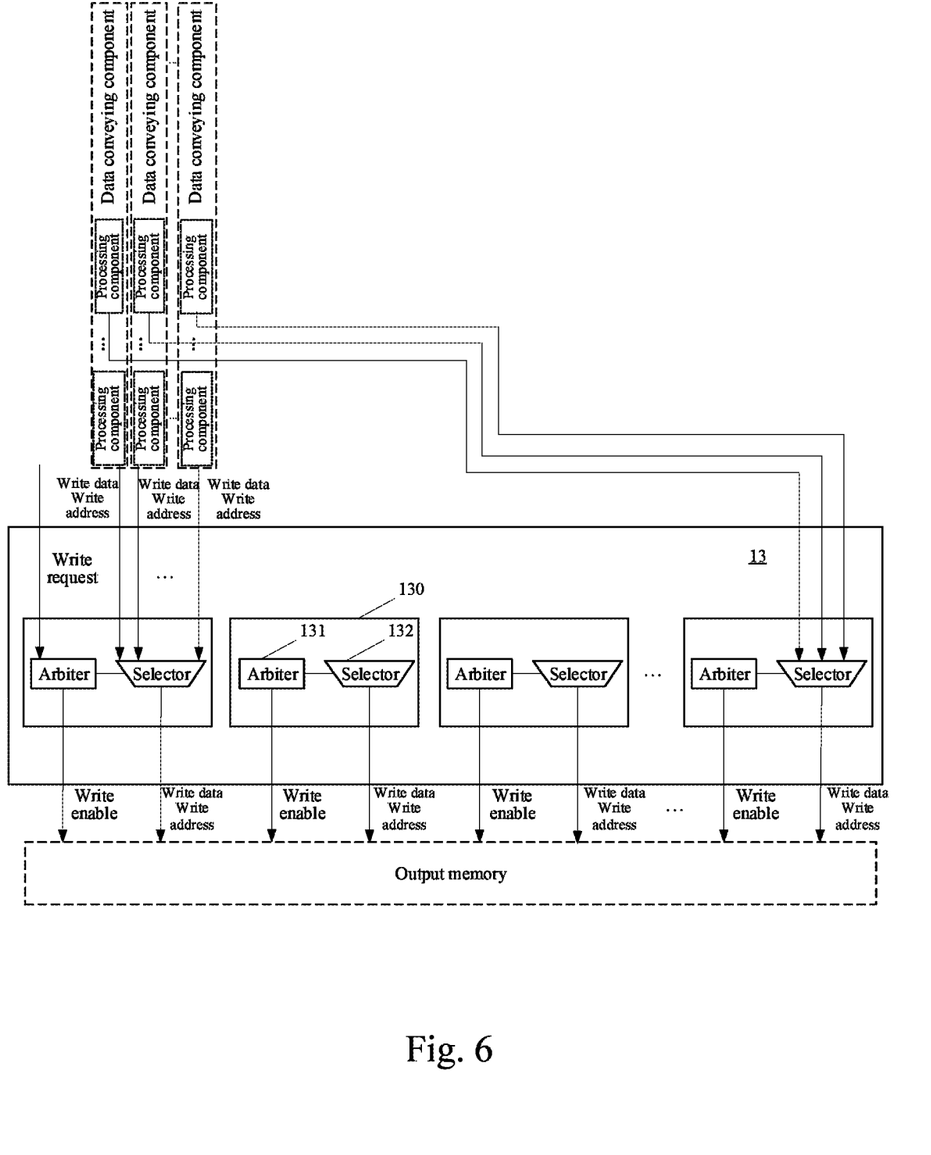
FIG. 6 is a schematic structural diagram of a multiplexed arbitration component in the apparatus for data processing according to an embodiment of the present disclosure.

Referring to FIG. 6, a schematic structural diagram of a multiplexed arbitration component in the apparatus for data processing in some optional implementations according to an embodiment of the present disclosure is shown.

As shown in FIG. 6, the multiplexed arbitration component 13 may comprise at least one arbitrating unit 130. Here, the number of arbitrating units 130 is optionally identical to the number of processing components in the data conveying component. Each of the arbitrating units 130 may include an arbiter 131 and a selector 132. The arbiter 131 may arbitrate the output data of one of the processing components in the data conveying components, control the selector 132 to select output data of one of the processing components and a corresponding write data address based on the arbitrating result, output the selected output data and corresponding write data address, and send a write enable signal to the at least one output memory.

In the present embodiment, supposing that the apparatus for data processing comprises N (N is a positive integer) data conveying components, each of the arbitrating units 130 is connected to one of the processing components in each data conveying component of the N data conveying components, that is, each of the arbitrating units receives the output data ("write data" shown in FIG. 6) and the corresponding write data address ("write address" shown in FIG. 6) of N processing components. A plurality of processing components in each of the data conveying components transmits the output data and the write data address to a plurality of arbitrating units corresponding to the plurality of processing components. Specifically, the arbiter may perform arbitration based on the write request sent by the connected N processing components, control the selector to select output data of one of the processing components and a corresponding write data address from the inputted output data of the N processing components based on the arbitrating result, and transmit the selected output data and corresponding write data address to the output memory.

Here, the write data address of the output data may be obtained by the processing component from calculation based on the write data address offset corresponding to its code, and an initial write data address obtained by parsing an external processing instruction. As an example, an offset step length of the write data address may be preset as 2, the code of the first processing component in the first data conveying component may be D1, the write data address obtained by parsing the processing instruction may be Add1, then the corresponding write data address offset is 2, and the write data address of the output data of the first processing component is an address obtained by adding 2 to Add1.

In the present embodiment, the selector may select a processing component in one of the data conveying components from processing components of the data conveying components, transmit the output data and the write data address of the selected processing component to the output memory, and send the write enable signal to the output memory. The output memory receives the write enable signal, the output data, and the corresponding write data address outputted by the multiplexed arbitration component, and is enabled to write the output data into the corresponding write data address under the control of the write enable signal.

Optionally, the output memory may further return a write response signal to the multiplexed arbitration component, and the multiplexed arbitration component may feedback the write response signal to a state machine of the data conveying component. The state machine may set a state of a command in a corresponding command register as "completed" based on the write response signal, and may alternative delete the command in the "completed" state from the command register. For a command that is not in a "completed" state in the command register, the state machine may repeatedly read the command from the command register based on a preset command caching period, control the multiplexer to select corresponding to-be-processed data for processing.

The arbitrating result is outputted using the multiplexed arbitrating unit, to guarantee that in the data transposition and conveying process, the output data is written into the memory in order, whilst guaranteeing the data writing speed, and enhancing the processing efficiency of the apparatus for data processing.

An embodiment of the present disclosure further presents an artificial intelligence chip. The artificial intelligence chip may include the apparatus for data processing described in the above embodiments. The apparatus for data processing includes at least one input memory, at least one data conveying component, at least one multiplexed arbitration component, and at least one output memory. The description of the embodiments and optional implementations shown in FIG. 1 to FIG. 5 may be referred to for the structures and working principles of components in the apparatus for data processing. The description will not be repeated here.

The artificial intelligence chip in the present embodiment may meet the requirements for highly intensive computation, access and storage for deep learning, training and prediction, thereby solving the problem of access and storage speed and flexibility of the method for data processing with a general purpose processor such as CPU or GPU, and a special purpose hardware device in a deep learning scenario, and improving the data processing efficiency.

Figure 7:
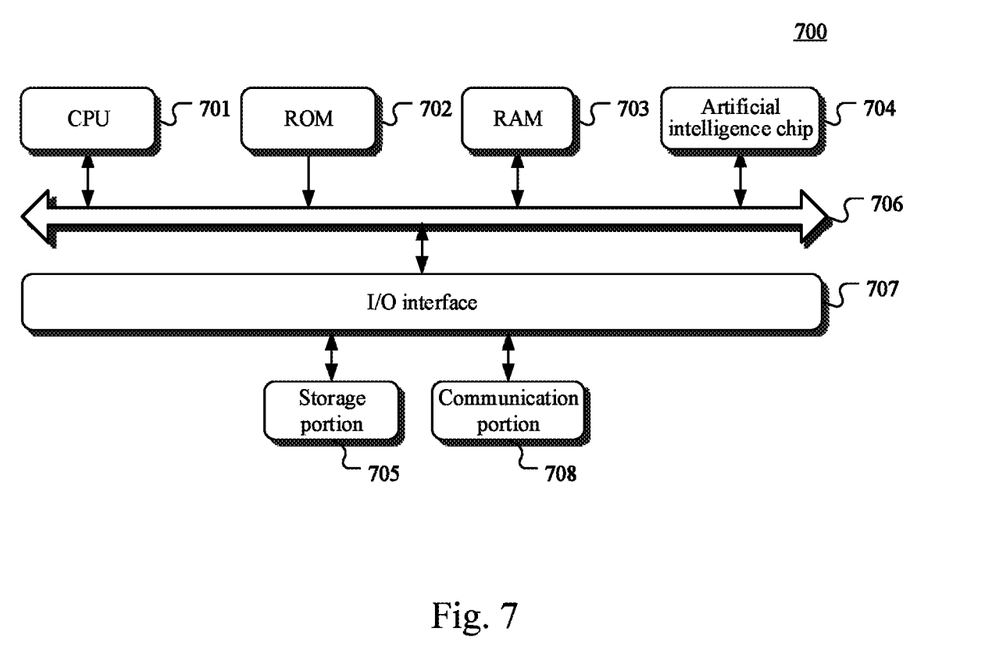
FIG. 7 is a schematic structural diagram of a computer system adapted to implement an electronic device of the embodiments of the present disclosure.

Referring to FIG. 7 below, a schematic structural diagram of a computer system 700 adapted to implement an electronic device of embodiments of the present disclosure is shown. The electronic device shown in FIG. 7 is merely an example, and should not limit the functions and scope of use of the embodiments of the present disclosure.

As shown in FIG. 7, the computer system 700 includes a central processing unit (CPU) 701, which may execute various appropriate actions and processes in accordance with a program stored in a read only memory (ROM) 702 or a program loaded into a random access memory (RAM) 703 from a storage portion 705. The RAM 703 also stores various programs and data required by operations of the system 700. The CPU 701 may alternatively send an instruction and data to an artificial intelligence chip 704 for data processing and analysis. For example, in a deep learning task, the CPU may transmit to-be-processed data loaded into the RAM 703 and an external processing instruction received through the communication portion to the artificial intelligence chip 704 to execute data processing. The CPU 701, the ROM 702, the RAM 703, and the artificial intelligence chip 704 are connected to each other through a bus 706. An input/output (I/O) port 707 is also connected to the bus 704.

In particular, according to the embodiments of the present disclosure, the process described above with reference to the flow chart may be implemented in a computer software program. For example, an embodiment of the present disclosure may include a computer program product, which comprises a computer program that is tangibly embedded in a computer readable medium. The computer program includes program codes for executing the method as illustrated in the flow chart. In such an embodiment, the computer program may be downloaded and installed from a network via the communication portion 708, or be loaded into the artificial intelligence chip. The computer program, when executed by the artificial intelligence chip 704, implements the above functions as defined by the input memory, the data conveying component, the processing component, and the output memory in the apparatus for data processing of the present disclosure.

It should be understood that the flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in sequentially may be executed, substantially in parallel, or they may sometimes be executed in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The above description only provides explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

The invention claimed is:

1. An apparatus for data processing, comprising:
at least one input memory, the input memory configured to store to-be-processed data;
at least one data conveying component, the data conveying component configured to read an external processing instruction, parse the processing instruction to acquire a read data address, a write data address, and an operating command, read the to-be-processed data from the at least one input memory based on the read data address, process the to-be-processed data based on the operating command to obtain output data and a corresponding write data address after multiplexed processing, and send a write data request, wherein the operating command comprises a data transposition command and a data conveying command, and the write data address corresponding to the output data is obtained by using the write data address obtained from parsing the processing instruction as an initial write address, and migrating the initial write address backward sequentially based on output time sequence of the output data to obtain the write data address corresponding to the output data;

at least one multiplexed arbitration component, the multiplexed arbitration component configured to receive, in response to receiving the write data request of the at least one data conveying component, the output data and the corresponding write data address of the at least one data conveying component, select output data and a corresponding write data address of one of the at least one data conveying component from the received output data and write data address, output the selected output data and corresponding write data address, and send a write enable signal; and at least one output memory, configured to receive, in response to receiving the write enable signal sent by the multiplexed arbitration component, the output data and the corresponding write data address from the multiplexed arbitration component, and write the received output data into the corresponding write data address.

2. The apparatus according to claim 1, wherein the data conveying component comprises:

a front-end decoding component, configured to parse the read processing instruction, and execute following parsing: extracting the read data address, the write data address, and the operating command from the processing instruction, sending a read data request to the at least one input memory, caching the to-be-processed data sent by the at least one input memory in response to receiving the read data request into a data queue, and caching the extracted operating command into a command queue; and at least one processing component, each of the at least one processing component configured to process the to-be-processed data in the data queue based on the operating command in the command queue, to obtain a piece of output data.

3. The apparatus according to claim 2, wherein the parsing executed by the front-end decoding component further comprises: determining whether the operating command is the data conveying command or the data transposition command, broadcasting, by the front-end decoding component, the to-be-processed data sent by the at least one input memory to the each of the at least one processing components if the operating command is the data conveying command; or sending, by the front-end decoding component, the to-be-processed data sent by the at least one input memory to corresponding at least one processing component if the operating command is the data transposition command, wherein each of the processing components is preconfigured with a corresponding read data address offset.

4. The apparatus according to claim 3, wherein the front-end decoding component determines whether the read processing instruction is a single-step execution instruction or a batch instruction after parsing the processing instruction;

executes the parsing if the processing instruction is the single-step instruction; or repeatedly executes the parsing a preset number of times if the processing instruction is the batch instruction, and adjusts the read data address and the write data address based on a preset address offset step length after executing the parsing each time.

5. The apparatus according to claim 2, wherein the processing component comprises:

a data register, configured to read the to-be-processed data from the data queue;

a command register, configured to read the operating command from the command queue;

a state machine, configured to perform state control based on a command of the command register; and a multiplexer, configured to select to-be-processed data from the data register based on control of the state machine, and output the selected to-be-processed data.

6. The apparatus according to claim 5, wherein the state machine is further configured to receive the write data address obtained by parsing the processing instruction from the command register, calculate the write data address of the output data based on the received write data address and the write address offset preconfigured in the at least one processing component, and send the write data request and the write data address of the output data to the at least one multiplexed arbitration component.

7. The apparatus according to claim 5, wherein the multiplexed arbitration component comprises at least one arbitrating unit, each of the at least one arbitrating unit comprises an arbiter and a selector, and the arbiter is configured to arbitrate the output data of one of the at least one processing component in the data conveying components, control the selector to select output data of one of the at least one processing component and a corresponding write data address based on a arbitrating result, output the selected output data and corresponding write data address, and send the write enable signal to the at least one output memory.

8. The apparatus according to claim 7, wherein the output memory is configured to receive the write enable signal, the output data, and the corresponding write data address outputted by the multiplexed arbitration component, and write the output data into the corresponding write data address under the control of the write enable signal.

9. The apparatus according to claim 1, wherein the input memory and the output memory are on-chip memories.

10. An artificial intelligent chip, comprising an apparatus for data processing, the apparatus comprising:

at least one input memory, the input memory configured to store to-be-processed data;

at least one data conveying component, the data conveying component configured to read an external processing instruction, parse the processing instruction to acquire a read data address, a write data address, and an operating command, read the to-be-processed data from the at least one input memory based on the read data address, process the to-be-processed data based on the operating command to obtain output data and a corresponding write data address after multiplexed processing, and send a write data request, wherein the operating command comprises a data transposition command and a data conveying command, and the write data address corresponding to the output data is obtained by using the write data address obtained from parsing the processing instruction as an initial write address, and migrating the initial write address backward sequentially based on output time sequence of the output data to obtain the write data address corresponding to the output data;

at least one multiplexed arbitration component, the multiplexed arbitration component configured to receive, in response to receiving the write data request of the at least one data conveying component, the output data and the corresponding write data address of the at least one data conveying component, select output data and a corresponding write data address of one of the at least one data conveying component from the received output data and write data address, output the selected output data and corresponding write data address, and send a write enable signal; and at least one output memory, configured to receive, in response to receiving the write enable signal sent by the multiplexed arbitration component, the output data and the corresponding write data address from the multiplexed arbitration component, and write the received output data into the corresponding write data address.

11. The artificial intelligent chip according to claim 10, wherein the data conveying component comprises:
a front-end decoding component, configured to parse the read processing instruction, and execute following parsing: extracting the read data address, the write data address, and the operating command from the processing instruction, sending a read data request to the at least one input memory, caching the to-be-processed data sent by the at least one input memory in response to receiving the read data request into a data queue, and caching the extracted operating command into a command queue; and
at least one processing component, each of the at least one processing component configured to process the to-be-processed data in the data queue based on the operating command in the command queue, to obtain a piece of output data.

12. The artificial intelligent chip according to claim 11, wherein the parsing executed by the front-end decoding component further comprises: determining whether the operating command is the data conveying command or the data transposition command, broadcasting, by the front-end decoding component, the to-be-processed data sent by the at least one input memory to the each of the at least one processing components if the operating command is the data conveying command; or sending, by the front-end decoding component, the to-be-processed data sent by the at least one input memory to corresponding at least one processing component if the operating command is the data transposition command, wherein each of the processing components is preconfigured with a corresponding read data address offset.

13. The artificial intelligent chip according to claim 12, wherein the front-end decoding component determines whether the read processing instruction is a single-step execution instruction or a batch instruction after parsing the processing instruction;
executes the parsing if the processing instruction is the single-step instruction; or
repeatedly executes the parsing a preset number of times if the processing instruction is the batch instruction, and adjusts the read data address and the write data address based on a preset address offset step length after executing the parsing each time.

14. The artificial intelligent chip according to claim 11, wherein the processing component comprises:
a data register, configured to read the to-be-processed data from the data queue;
a command register, configured to read the operating command from the command queue;
a state machine, configured to perform state control based on a command of the command register; and
a multiplexer, configured to select to-be-processed data from the data register based on control of the state machine, and output the selected to-be-processed data.

15. The artificial intelligent chip according to claim 14, wherein the state machine is further configured to receive the write data address obtained by parsing the processing instruction from the command register, calculate the write data address of the output data based on the received write data address and the write address offset preconfigured in the at least one processing component, and send the write data request and the write data address of the output data to the at least one multiplexed arbitration component.

16. The artificial intelligent chip according to claim 14, wherein the multiplexed arbitration component comprises at least one arbitrating unit, each of the at least one arbitrating unit comprises an arbiter and a selector, and the arbiter is configured to arbitrate the output data of one of the at least one processing component in the data conveying components, control the selector to select output data of one of the at least one processing component and a corresponding write data address based on a arbitrating result, output the selected output data and corresponding write data address, and send the write enable signal to the at least one output memory.

17. The artificial intelligent chip according to claim 16, wherein the output memory is configured to receive the write enable signal, the output data, and the corresponding write data address outputted by the multiplexed arbitration component, and write the output data into the corresponding write data address under the control of the write enable signal.

18. The artificial intelligent chip according to claim 10, wherein the input memory and the output memory are on-chip memories.

19. An electronic device, comprising a central processing unit and the artificial intelligence chip according to claim 10.

* * * * *